Aug. 5, 1924.
H. A. FRASER ET AL
1,503,945
MACHINE FOR MANUFACTURING COILED WIRE FABRIC
Original Filed Aug. 27, 1921   3 Sheets-Sheet 1
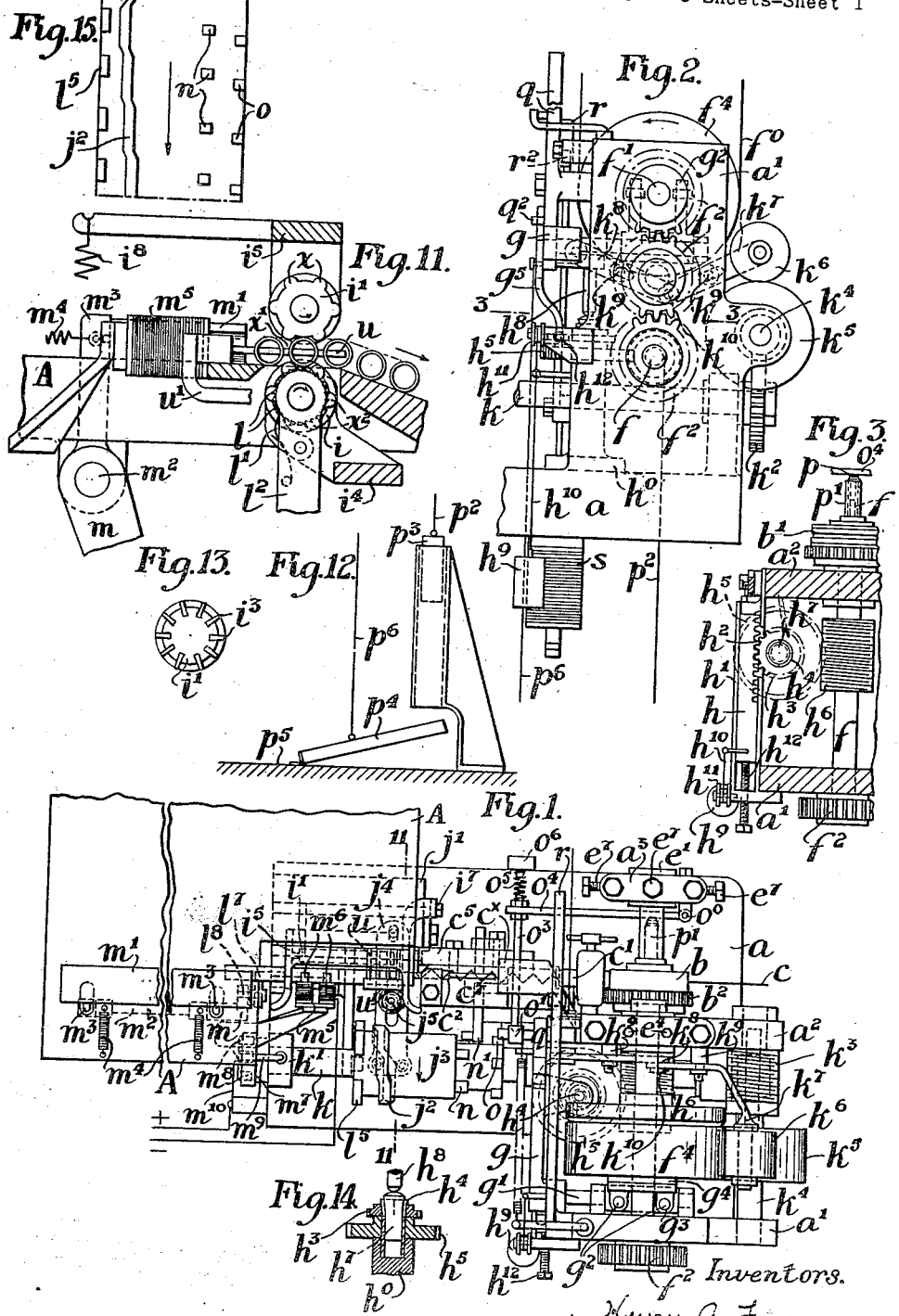
Inventors.

Aug. 5, 1924.
H. A. FRASER ET AL
1,503,945
MACHINE FOR MANUFACTURING COILED WIRE FABRIC
Original Filed Aug. 27, 1921   3 Sheets-Sheet 2
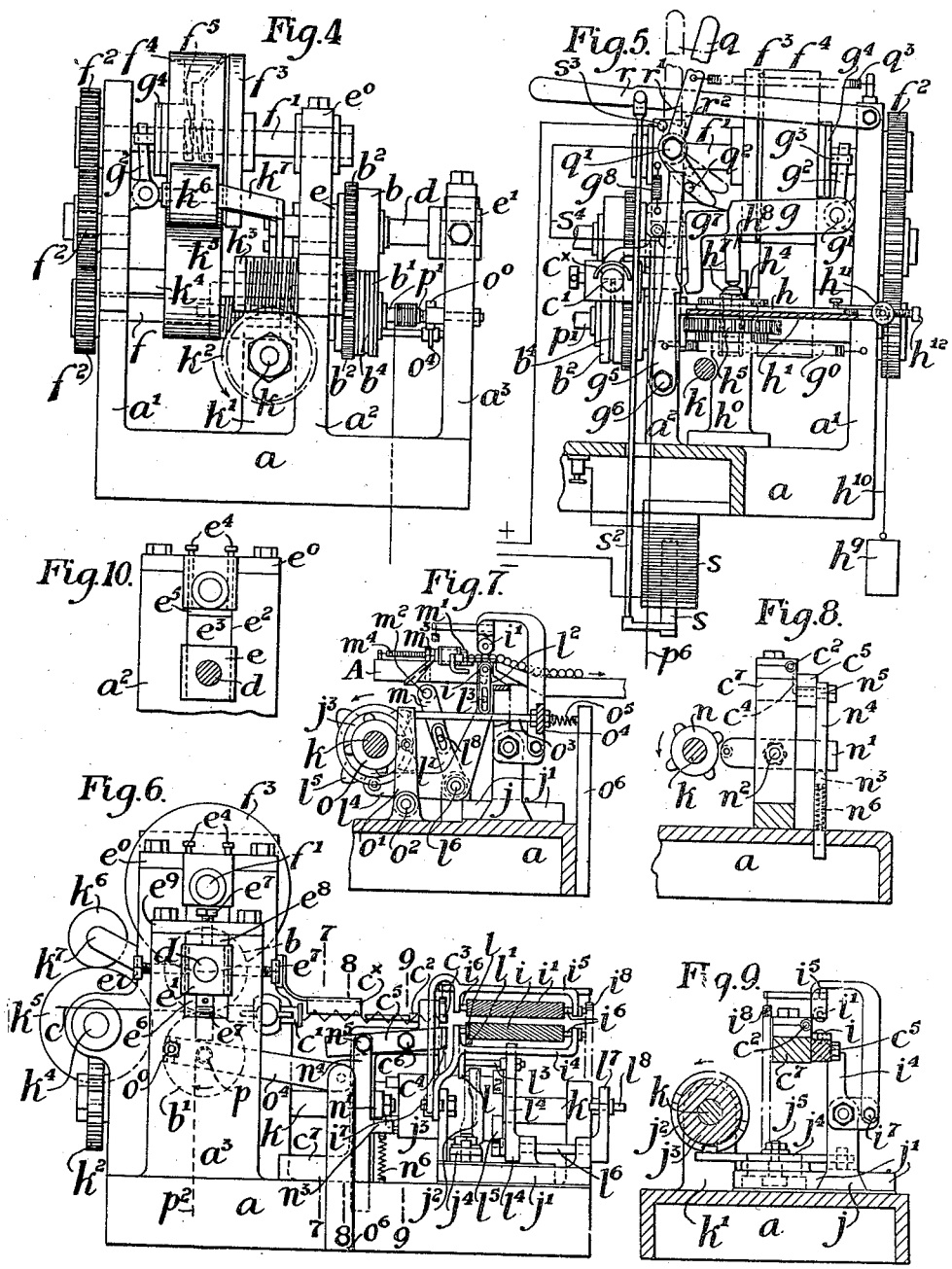
Inventors.
Henry A. Fraser
and Peter F. Crighton
By George A. Prevost, atty Aug. 5, 1924.
H. A. FRASER ET AL
1,503,945
MACHINE FOR MANUFACTURING COILED WIRE FABRIC
Original Filed Aug. 27, 1921   3 Sheets-Sheet 3
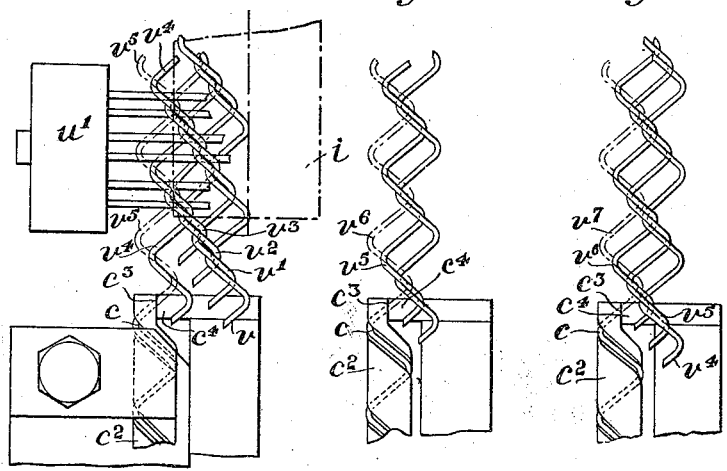
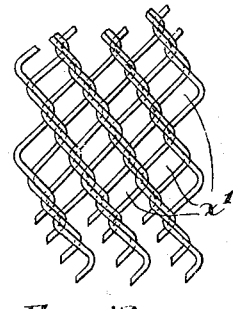
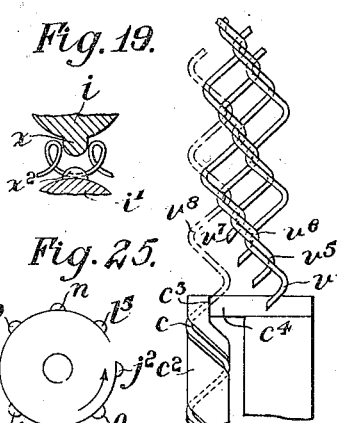
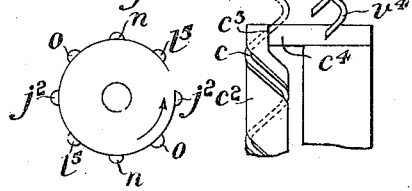
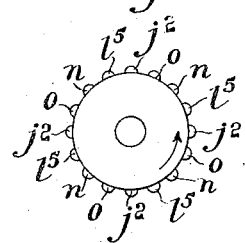
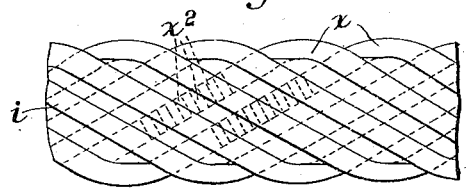
*Inventors*
Henry A. Fraser
and Peter F. Creighton
By George A. Privat, atty.

Patented Aug. 5, 1924.

1,503,945

UNITED STATES PATENT OFFICE.

HENRY ARTHUR FRASER AND PETER FREDERICK CRIGHTON, OF LONDON, ENGLAND.

MACHINE FOR MANUFACTURING COILED-WIRE FABRIC.

Original application filed August 27, 1921, Serial No. 495,986. Patent No. 1,431,645, dated October 10, 1922. Divided and this application filed July 1, 1922. Serial No. 572,347.

*To all whom it may concern:*

Be it known that we, HENRY ARTHUR FRASER and PETER FREDERICK CRIGHTON, subjects of the King of Great Britain, residing at 13 Wharf Road, London, England, have invented new and useful Improvements in Machines for Manufacturing Coiled-Wire Fabric, of which the following is a specification.

This invention relates to the weaving of coiled wire fabrics, such, for instance, as are used for mattresses, of the class known as diagonal or interlaced weave, and this application is a division of Patent No. 1,431,645.

According to one method this class of weave has been effected partly by mechanical means and partly by hand, that is to say, the coiling of the wire to form each strand has been effected by a machine whilst the severing and the positioning or longitudinal movement of the last severed coil or strand and the fabric to enable the next coil or strand to be run in to engage therewith has been effected by hand.

In another method the fabric has been made in strips by a machine but instead of the finished strips being rectangular they have had two opposite edges inclined with respect to the other two edges.

In another method the fabric is made in continuous widths by a machine in which the coiling, severing and positioning mechanisms are controlled by hand and in this case the fabric has two opposite edges inclined with respect to the other two.

Now, the object of the invention is to produce a fabric of diagonal or interlaced weave of rectangular form and to this end we adapt machines such as are used for weaving plain coiled wire fabrics embodying coiling mechanism, severing mechanism and positioning mechanism.

In a suitable arrangement for carrying out the invention we make use of a machine such as described in our Patent No. 1,431,645 and we arrange the cam mechanism similarly to that used for effecting the longitudinal movement of the positioning rollers therein, but so arranged as to effect the running in of the coils in sets of four or more, one after the other and the positioning thereof at equal distances longitudinally and laterally, the fabric after the last coil of each set is in position being positioned to enable the first coil of the next set to be run in, the cut ends of every first coil of each set being level or terminating in a straight line which is at right angles to the axes of the coils themselves and consequently to the coils forming the ends of the fabric. To adapt the positioning rollers for gripping and feeding the fabric laterally we arrange the ribs or fins thereon spirally instead of longitudinally.

To enable the invention to be fully understood we will describe it by reference to the accompanying drawing, in which:—

Fig. 1 is a plan of a machine constructed according to the invention for manufacturing or weaving coiled wire fabrics and Fig. 2 is an elevation of a portion of the same.

Fig. 3 is a horizontal section on the line 3—3, Fig. 2.

Fig. 4 is a view of the right hand side of the machine, and

Fig. 5 is a sectional view of a part of the opposite side thereof.

Fig. 6 is a rear view of the machine, and

Figs. 7, 8 and 9 are respectively vertical sections on the lines 7—7, 8—8 and 9—9 of Fig. 6, certain parts being omitted from each of these figures for the sake of clearness.

Fig. 10 is an elevation of a portion of the frame of the machine showing some of the bearings.

Fig. 11 is an enlarged section on the line 11—11, Fig. 1, illustrating clearly the positioning rollers.

Fig. 12 is an elevation showing the falling weight and lever operated thereby.

Fig. 13 is a section of a modified form of positioning roller.

Fig. 14 is a sectional view of one of the friction clutches.

Fig. 15 is a development of the surface of the drum carrying the cams for effecting the lateral and longitudinal movements of the feed rollers, the operation of the coiling gear and the operation of the wire severing mechanism.

Fig. 16 is a plan showing the grooved mandrel along which the coiled wire travels from the coiling mechanism, the severing cutting mechanism, the comb for assisting to maintain the last made coils in their proper relative positions longitudinally and the positioning rollers in dotted lines, the said figure illustrating the first stage of the manufacture of diagonal weave fabric.

Fig. 17 is a front elevation of the said mechanism but without the severing devices and drawn to a smaller scale than Fig. 1.

Fig. 18 is a plan of the positioning rollers but drawn to an enlarged scale and

Fig. 19 is a cross section through the contiguous portions of the said rollers showing their relationship to the fabric.

Figs. 20, 21 and 22 are somewhat similar views to Fig. 1, but showing further and progressive stages in the manufacture of the diagonal weave fabric.

Fig. 23 is a plan of a piece of such fabric.

Fig. 24 is a diagrammatic view illustrating the order or arrangement of the cams shown in Fig. 15.

Fig. 25 is a similar view of the order or arrangement of such cams as described in the specification of our Patent No. 1,431,645 for manufacturing fabrics of plain weave.

$a$ is the frame or base of the machine provided with three standards $a^1$, $a^2$, $a^3$. Between the standards $a^2$, $a^3$ are arranged the feed rollers for the coiling mechanism and comprising the upper plain roller $b$ and the lower grooved roller $b^1$, the peripheries of which rollers revolve nearly in contact with one another. The said rollers are geared together so as to run at equal speeds by means of rings of spur teeth $b^2$. $c$ is the wire to be coiled and which is drawn from a spool in the usual way and may be in one, two or more plies, the said wire or wires lying in the groove $b^4$ in the roller $b^1$, and being gripped therein by pressure of the top roller $b$ thereon, and fed into the coiling die $c^1$ of usual or known form. The top roller $b$ is supported upon a shaft $d$ carried in bush bearings $e$, $e^1$ in the standards $a^2$, $a^3$, respectively. The bush $e$ is held in position in a recess $e^2$ in the standard $a^2$ and is pressed upon its upper part by a rubber block $e^3$ to which pressure can be imparted by set screws $e^4$ through the medium of a plate $e^5$ the said screws passing through the cap $e^9$. The bearing $e^1$ is supported in a recess $e^6$ in the standard $a^3$ and can be adjusted therein through the medium of set screws $e^7$ to impart the necessary pressure to the wire $c$ (or wires). A rubber block $e^8$ is advantageously interposed between the bush $e^1$ and a covering cap $e^9$ connected to the upper part of the standard $e^3$. The roller $b^1$ is supported on a shaft $f$ arranged in bearings in the standards $a^1$, $a^2$ and designed to be rotated to effect the rotation of the rollers $b$, $b^1$ from a shaft $f^1$ supported in bearings at the top of the said standards $a^1$, $a^2$ through the medium of a train of three gear wheels $f^2$. The said shaft $f^1$ has connected thereto one member $f^3$ of a friction clutch, the other member $f^4$ of which is loose on the said shaft and is in the form of a pulley which is constantly rotated by a suitable belt and when pressed into contact with the member $f^3$ effects the rotation of the rollers $b$, $b^1$. The members $f^3$, $f^4$ constitute the main clutch and have arranged between them a spring $f^5$.

$g$ is the controlling lever pivoted at one end by a shaft $g^1$ to the standard $a^1$, the said shaft being provided with arms $g^2$ which engage holes in lugs $g^3$ on a disc $g^4$ mounted loosely on the shaft $f^1$ and bearing against the pulley $f^4$, so that, when the said lever $g$ is rocked in one direction on its pivot, the member $f^4$ of the main clutch will be pressed into contact with the other member $f^2$. $g^5$ is the catch for holding the controlling lever $g$ in position after it has effected the pressing together of the two members of the main clutch, the said catch, which is pivoted at $g^6$ to the standard $a^2$, engaging, under the pull of a spring $g^0$, a hooked projection $g^7$ on the lever $g$, the said lever being held in this position against the pull of a spring $g^8$. The coiling gear is designed to be intermittently driven and to enable this to be effected, we provide means for disengaging the catch $g^5$ from the hook projection $g^7$ on the controlling lever $g$. For this purpose, we provide the horizontal bar $h$ slidably supported in a guide $h^1$ carried on the standards $a^1$, $a^2$ and having rack teeth $h^2$ in mesh with a pinion $h^3$, as shown clearly in Fig. 3. This pinion is rotated by a clutch, preferably in the form of a split tapered sleeve $h^4$, Figs. 2, 5 and 14, fitted within a central hole in the said pinion and formed on, or attached to, a gear wheel $h^5$, the latter meshing with a worm $h^6$ on the shaft $f$ and being carried in a bearing in a pillar $h^0$. Within the split sleeve $h^4$ is fitted a taper pin $h^7$ designed to be moved within the sleeve $h^4$ so as to expand the latter into tight contact with the hole in the pinion $h^3$, this movement being imparted by a downward extension $h^8$ on the controlling lever $g$. When the pressure of the said extension is removed from the pin $h^7$, the sleeve $h^4$ will contract and so become disengaged from the pinion $h^3$.

The rack bar $h$ is moved by the pinion $h^3$ to disengage the catch $g^5$ against the pull of a weight $h^9$ through the medium of a cord $h^{10}$ running over a pulley $h^{11}$. $h^{12}$ is a set screw for determining the starting position of the rack bar $h$ so that the duration of the movement of the said bar $h$ to strike the catch $g^5$, can be varied according to the time at which it is required to run the coiling gear and consequently the length of coil or strand produced.

The coiled wire is fed from the die $c^1$ around the grooved mandrel $c^2$ in the known manner, the end of the said mandrel forming one surface $c^3$ of a pair of cutting surfaces, the other one $c^4$ of which is movable and supported and carried by a lever $c^5$ actuated as hereinafter described. This lever is pivoted at $c^6$ to a bracket $c^7$ carried on the frame $a$, the said bracket also serving for supporting the mandrel $c^2$.

$i$, $i^1$ are the positioning rollers arranged horizontally one above the other, with a space between them to grip each row of coils in turn of the fabric being made, the said rollers being located with their axes parallel to the axis of the coiled wire lying between the mandrel $c^2$ and the coiling die $c^1$, but out of line therewith and just beyond the rear end of the mandrel $c^2$ as indicated in Fig. 1, so that, say, after two rows of coils have been issued from said mandrel in succession and linked with one another, the second row as indicated clearly in Fig. 11, will be located between the positioning rollers $i$, $i^1$, so that the latter can, by rotating in the direction of the arrows, feed the fabric to receive fresh rows in turn, as hereinafter described. The coils as they issue from the mandrel $c^2$ run on to the table A, the upper surface of which is level with the upper surface of the lower roller $i$.

The rollers $i$, $i^1$ are provided respectively with spirally arranged teeth $x^2$ and spiral ribs $x$ so as to grip the coils as indicated in Fig. 11; and hereinafter more fully described. Fig. 13 is a cross section of the positioning roller $i$ in which fins $i^3$ are substituted for the ribs $x$. $i^4$, $i^5$ are the housings in which the rollers $i$, $i^1$ are carried on centres $i^6$, these housings being hinged together as indicated at $i^7$, Fig. 9, and drawn towards one another by springs $i^8$ attached at one end to lugs on the housing $i^5$ and at the other end to the base $a$. $j$ is the slide upon which the housings carrying the rollers $i$, $i^7$ are mounted so that longitudinal movement can be imparted to the said rollers for positioning the fabric so that the new or running coil is engaged with the coils already made at the proper point. This slide works in guides $j^1$ on the frame $a$ and is actuated from a cam $j^2$ in the form of a rib on a drum $j^3$ through the medium of a lever $j^4$ adjustably pivoted to the frame $a$ at $j^5$. This cam is carried on a shaft $k$ mounted in bearings $k^1$ on the frame $a$ and driven by a worm wheel $k^2$ on the shaft $k$ from a worm $k^3$, carried on a shaft $k^4$ mounted in bearings in the standards $a^1$, $a^2$. This shaft $k^4$ carries a friction wheel $k^5$ designed to be driven from the pulley $f^4$ through the medium of the friction roller $k^6$, which is brought into contact with both the belt on the pulley $f^4$ and the wheel $k^5$ by a pair of toggle levers $k^7$, $k^8$. These levers are slidably supported on fulcrum pins $k^9$ on the standard $a^2$ and jointed together at $k^{10}$, the outer end of the lever $k^7$ carrying the roller $k^6$, whilst the outer end of the lever $k^8$ is pivoted to the controlling lever $g$. It will thus be seen that when the controlling lever is moved upwardly it disengages the main clutch members $f^3$ and $f^4$ and at the same time moves the friction roller $k^6$ into contact with the driving belt $f^0$ surrounding the pulley $f^4$ and thus drives the wheel $k^5$ and consequently rotates the cam drum $j^3$.

For rotating the positioning rollers $i$, $i^1$, the lower roller $i$ is provided at its front end with ratchet teeth $l$, as shown clearly in Fig. 11, corresponding in number with the ribs $i^1$ thereon, so that the said roller can be fed or rotated one rib at a time, in order to displace the coiled fabric laterally one coil at a time. $l^1$ is a pawl engaging with the said ratchet teeth and carried on a short lever $l^2$ pivoted on one of the centres carrying the roller $i$, the said lever being oscillated by a pin $l^3$ on a bell crank lever $l^4$ actuated by a cam $l^5$ carried on the drum $j^3$, the said bell crank lever being fulcrumed on the frame $a$ by a shaft $l^6$ which also carries an arm $l^7$. This arm $l^7$, through the medium of a pin $l^8$, rocks another arm $m$ to impart movement to a bar $m^1$ resting on the table A, which bar forms a guide for the running coil and assists the rollers $i$, $i^1$, to feed the fabric after each coil is inserted. This feeding movement is effected simultaneously with the feed movement of the said rollers $i$, $i^1$ through the movement of the said arms $l^7$, $m$ from the bell crank lever $l^4$, the arm $m$ being fulcrumed on a shaft $m^2$ carrying upstanding arms $m^3$ which bear against one side of the bar $m^1$ and actuate the latter to feed the fabric against the pull of tension springs $m^4$.

$n$ is the cam for effecting the severing of the coils, after being run on to the table A, by means of the cutting surfaces $c^3$, $c^4$. This cam actuates a lever $n^1$, Fig. 8, fulcrumed at $m^2$ to the bracket $c^7$ and bearing upon a lug $n^3$ on an upright rod $n^4$ pivoted at $n^5$ to the lever $c^5$. The rod $n^4$ slides and is guided in a hole in the frame $a$ and is pressed upwardly in contact with the lever $n^1$ by a spring $n^6$.

In order to keep the running coil in contact with the bar $m^1$ we employ an electromagnet $m^5$, the faces of the pole pieces $m^6$ of which are level with the guide surface of the said bar $m^1$. This magnet is energized, each time a coil is run into the fabric, by a switch in the form of a drum $m^7$ carried upon the shaft $k$ and having contacts $m^8$ with which a brush $m^9$ in electrical connection with one terminal of the magnet makes contact four times in each revolution of the shaft $k$. These contacts $m^8$ are in permanent electrical connection by a brush $m^{10}$ with one pole of a source of current, the other pole of which is in electrical connection with the other terminal of the magnet.

$o$ is a cam for automatically effecting the movement of the controlling lever $g$ to throw in the main clutch to drive the coiling gear and stop the rotation of the cam shaft $k$. This cam actuates a lever $o^1$ fulcrumed at $o^2$ to a lug on the frame $a$ and connected at its upper end by a rod $o^3$ to a lever $o^4$ pivoted at $o^0$ to the standard $a^3$, the cam $o$ moving the rod $o^3$ against the pressure of a spring $o^5$ located between the end of the said rod $o^3$ and a bracket $o^6$ attached to the frame $a$. This lever $o^4$, until actuated by the cam $o$, presses against the taper pin $p$ of a clutch mechanism similar to that described in connection with the pinion $h^3$. This pin $p$ is located in a hole formed in one end of the shaft $f$, the said end being split and formed taper to fit the pin $p$ and has fitted on its outer surface a loose sleeve $p^1$ to which is attached a cord $p^2$ carrying at its lower end a weight $p^3$, shown clearly in Fig. 12. Below the weight $p^3$ is arranged a lever $p^4$ hinged to the floor $p^5$, or to a suitable part of the machine, and connected by a cord or wire $p^6$ to the outer end of the controlling lever $g$. The pressure of the spring $o^5$ causes the pin $p$ to expand the split end of the shaft $f$ to grip the sleeve $p^1$ and, assuming that the cord $p^2$ is wound upon the sleeve, as indicated in the drawings, and the cam $o$ be caused to actuate the lever $o^4$ to relieve the pressure on the pin $p$, the friction between the split end of the shaft $f$ and the sleeve $p^1$ will consequently be relieved, and allow the latter, under the influence of the weight $p^3$, to be revolved so that the weight will be lowered and strike the lever $p^4$, which, through the medium of the cord $p^6$, will lower the controlling lever $g$ against the pull of the spring $g^8$ and connect the members of the main clutch so that motion is imparted to the coiling gear, the said lever $g$ being held in the lowered position by the engagement of the catch $g^5$ with the hooked extension $g^7$.

$q$ is the lever for starting the machine, which lever is of bell crank form pivoted at $q^1$ to the upper part of the standard $a^2$ and in the stopped position bears against the controlling lever $g$ and holds it in an intermediate position, as indicated in Fig. 5, in which the roller $k^6$ is out of contact with the belt $f^0$. The said lever $q$ is provided with a stop pin $q^2$ which, in the said stopped position, holds the catch $g^5$ in such a position that it cannot engage with the hooked extension $g^7$. By moving the said lever $q$ to the dotted line position in the said Fig. 5, it will be seen that the controlling lever $g$ will be free to rise under the pull of its spring $g^8$, so that the toggle levers $k^7$, $k^8$ will be moved to cause the friction roller $k^6$ to engage with the pulley belt $f^0$ and wheel $k^5$, thereby effecting the rotation of the shaft $k$ and causing the cam $o$ to move the lever $o^4$ to release the weight $p^3$ and through the medium of the lever $p^4$ and cord $p^6$ to lower the controlling lever $g$ into engagement with the catch $g^5$. The shaft $k$ will thus cease rotating on the disengagement of the roller $k^6$ with the wheel $k^5$ and belt $f^0$, and the pulley $f^4$ will be caused to engage with the member $f^3$ so that the coiling gear will be rotated to deliver a running coil on to the table A.

The starting lever $q$ is held in the dotted lined position by a pivoted latch $r$ against the pull of a tension spring $q^3$, the said latch having a notch $r^1$ in which engages a projection $r^2$ on the starting lever $q$, so that it is necessary, when stopping the machine, that the latch $r$ be lifted in order that the starting lever $q$ may be drawn to the full line position under the influence of the spring $q^3$. This stopping operation is also automatically effected if the wire being coiled should issue from the coiling mechanism deformed, and for this purpose we employ a solenoid $s$, the core $s^1$ of which is connected by a rod $s^2$ to the latch $r$ and a stud $s^3$ is mounted on the standard $a^2$ but insulated therefrom and which is in electrical connection with one pole of a source of current as indicated in Fig. 5. The starting lever $q$ is provided with an insulated contact piece which, when the said lever is moved to the dotted line position, makes contact with the said stud. In front of the coiling die $c^1$ is arranged a shield in the form of a semicircular piece of sheet metal $c^x$ with which the deformed wire is designed to contact and which is carried on but insulated from the standard $a^2$ and in electrical connection by a wire $s^4$ with the insulated contact on the lever $q$. One terminal of the solenoid is connected to the other pole of the source of current whilst the other terminal is connected to the frame as indicated. Assuming the machine to be running, the lever $q$ being in the dotted line position, if the wire being coiled should become deformed so that it touches the shield $c^x$, current will circulate through the stud $s^3$, the contact on the lever $q$, the wire $s^4$, the said shield, the coiling die $c^1$ and the frame $a$ to the solenoid $s$ so that the core $s^1$ will be sucked into the latter and lift the lever $r$.

The cams $o$, $l^5$, $j^2$, $n$ indicated in the development figure 15 and diametrically in the order of working in Fig. 24 and effecting, respectively, the operation of the coiling gear, the lateral feed or rotation of the positioning rollers $i$, $i^1$ the longitudinal movement of the said rollers and the operation of the movable cutting member $c^4$ relatively to the fixed cutting member to sever the coils or strands, are similar to those described in our said Patent No. 1,431,645 for making coiled wire fabric of plain weave and the order of working of which cams for this latter purpose is illustrated in Fig. 25. On comparison of these two Figures 24 and 25 it will be seen that the order of the four cams for making the diagonal weave and the plain weave is the same but they are arranged in four sets around the cam shaft for making the diagonal weave as against two sets for making the plain weave.

In the operation assume that four coils $v$, $v^1$, $v^2$, $v^3$, Fig. 16, have been successively delivered by the coiling mechanism, the required lateral and longitudinal positioning of each coil to receive the next run-in coil having been effected by hand and assume now that the said coils have been moved laterally into engagement with the positioning rollers $i$, $i^1$ whereby the said coils are secured against longitudinal movement whilst the next coil is being run in. Assume now that the machine is running and that one of the cams $j^2$, for instance, that at the top of Fig. 24 has operated to position the coils $v$, $v^1$, $v^2$, $v^3$ backward with respect to the cutting mechanism. The coiling gear will then be brought into operation by the next adjacent cam $o$ and the first coil $v^4$ of the next set of four coils will be run in and engage the coils $v^2$ and $v^3$ and the next adjacent cam $n$ will actuate the cutting member $c^4$ to sever the said coil $v^4$. The next adjacent cam $l^5$ will then cause the rotation of the rollers $i$, $i^1$ to effect the feed of the fabric laterally. The second cam $j^2$ in the order of working will now come into operation and effect a forward movement of the fabric by means of the rollers $i$, $i^1$ so as to bring the coil $v^4$ into the position indicated in Fig. 16. The coiling gear will then again come into operation by the action of the second cam $o$ and the second coil $v^5$ of the next set of coils will be run in and engage the coils $v^3$ and $v^4$, as indicated by the dotted lines in the said figure, and be severed by the action of the second cam $n$. The second cam $l^5$ will then come into operation and cause the rotation of the rollers $i$, $i^1$ to again feed the fabric laterally. The other two sets of cams $j^2$, $l^5$, $n$, $o$ will effect the running in of the next two coils $v^6$, $v^7$, Figs. 20 and 21, to complete the second set of four coils, the cam $j^2$ at the top of Fig. 24 then again operating to position the fabric backward into position to receive the first coil $v^8$, Fig. 22, of another set of four coils, and so on.

By the described mode of operation it will be understood that we are enabled to produce a coiled wire fabric of diagonal weave the ends of which are square with, or at right angles to, the sides as indicated clearly in Fig. 23, the cut ends of every fourth coil being level or terminating in a straight line which is at right angles or square with the axes of the coils themselves.

Instead of forming the rollers $i$, $i^1$ with longitudinal parallel ribs or fins as described in our Patent No. 1,431,645 which are not adapted for engagement with the diagonal weave fabric, we form one of such rollers with spirally arranged ribs $x$ as indicated clearly in Figs. 17, 18 and 19, which ribs engage with the diagonal grooves $x^1$ in the fabric, whilst the spaces between the wires forming such grooves are engaged by teeth $x^2$ on the other roller. To assist in maintaining the coils in their proper relative positions longitudinally, the first five coils, say, are pierced by the teeth $u$ of a horizontal comb connected by a frame $u^2$ to the lower housing $i^4$.

In the drawings, it will be noticed that the fabrics therein shown are made of single ply, that is of one wire only for each coil, but it is to be understood that two or more wires can be employed for each coil.

By the employment of the positioning rollers we are enabled to produce fabrics the coils of which are of very small diameter and pitch as compared with fabrics hitherto made.

What we claim and desire to secure by Letters Patent is:—

1. In a machine for manufacturing diagonal weave coiled wire fabrics of rectangular form, a coiling mechanism adapted to twist wire into a substantially helical strand, feeding members for gripping and positioning the fabric, said members cooperating with the coiling mechanism to retain the fabric in a definite position while a strand produced by the coiling mechanism is being intertwisted into a plurality of the strands of the fabric, means for cutting the wire after a predetermined length of the same has been coiled by the coiling mechanism, and controlling mechanism functioning to intermittently actuate the coiling mchanism, feeding members and cutting means successively in the order named, and to move the feeding members intermittently and progressively toward the cutting means until more than one strand has been severed by the cutting means.

2. A machine for manufacturing diagonal weave coiled wire fabrics of rectangular form, including coiling mechanism arranged to twist wire into substantially helical form, means for feeding the wire relatively to the coiling mechanism, gripping members arranged to engage and hold the fabric in position while a coil from the coiling mechanism is intertwisting with a plurality of coils of the fabric, means for cutting the wire after each coil has been intertwisted with the coils of the fabric, and means for actuating the gripping members to cause the latter to intermittently feed the fabric transversely into positions to permit the coiling mechanism to intertwist a coil into a plurality of coils of the fabric, and other means for actuating the gripping members to intermittently and progressively feed said members toward the cutting means during the time that the cutting means is actuating a plurality of times.

3. A machine for manufacturing coiled wire fabric, comprising in combination means for coiling wire, means for severing each coil after the latter has been run into the fabric, positioning mechanism gripping the fabric and holding the latter in such position that a coil from the coiling means will be intertwisted with a plurality of the coils of the fabric, means actuating the positioning mechanism to cause the latter to feed the fabric transversely after each operation of the severing means, and other means actuating the gripping mechanism to cause the latter to feed the fabric toward the coiling means progressively after each severing operation until more than two severing operations have taken place, said last mentioned means functioning to move the positioning mechanism away from the coiling means after a plurality of severing operations.

4. A machine as claimed in claim 3 including a comb arranged in close proximity to the coiling mechanism and having teeth adapted to extend transversely through certain coils of the fabric.

5. A machine as claimed in claim 3 in which the positioning mechanism includes superposed rollers, one of which is provided with spirally arranged spaced teeth.

6. A machine as claimed in claim 3 in which the positioning mechanism includes superposed rollers, one of which is provided with spirally arranged spaced ribs and the other of which has spirally arranged spaced teeth.

7. A machine as claimed in claim 3 in which the positioning mechanism actuating means includes cam elements adapted to control the last mentioned means and arranged to cause first the severing of a coil; second, the feeding of the fabric transversely; third, the feeding of the fabric toward the coiling means; fourth, the operation of the coiling means to produce an additional coil; fifth, the severing of the last mentioned coil; sixth, a further movement of the fabric transversely and seventh, the further movement of the fabric forwardly toward the coiling means.

HENRY ARTHUR FRASER.
PETER FREDERICK CRIGHTON.